United States Patent
Caddell, Jr. et al.

(10) Patent No.: US 7,137,544 B2
(45) Date of Patent: Nov. 21, 2006

(54) APPARATUS AND METHOD FOR PERFORMING WELDING AT ELEVATED TEMPERATURE

(75) Inventors: James Walter Caddell, Jr., Milford, OH (US); Robert Dale Lawrence, Hamersville, OH (US)

(73) Assignee: General Electric Company, Schenectady, NY (US)

( * ) Notice: Subject to any disclaimer, the term of this patent is extended or adjusted under 35 U.S.C. 154(b) by 271 days.

(21) Appl. No.: 10/318,764

(22) Filed: Dec. 13, 2002

(65) Prior Publication Data

US 2004/0112940 A1    Jun. 17, 2004

(51) Int. Cl.
    *B23Q 3/00*    (2006.01)
(52) U.S. Cl. .............................. 228/9; 228/42; 228/103
(58) Field of Classification Search ................ 228/103, 228/42, 9; 156/273.3, 257, 278, 298; 219/121.65, 219/121.67
See application file for complete search history.

(56) References Cited

U.S. PATENT DOCUMENTS

| | | | |
|---|---|---|---|
| 3,812,318 A | | 5/1974 | Yoshizumi et al. |
| 5,155,336 A | * | 10/1992 | Gronet et al. ............... 219/411 |
| 5,319,179 A | | 6/1994 | Joecks et al. |
| 5,897,801 A | | 4/1999 | Smashey et al. |
| 6,054,687 A | | 4/2000 | Conner et al. |
| 6,121,579 A | * | 9/2000 | Aoki et al. ................. 219/390 |
| 6,124,568 A | | 9/2000 | Broderick et al. |
| 6,172,327 B1 | | 1/2001 | Aleshin et al. |
| 6,297,474 B1 | | 10/2001 | Kelly et al. |
| 6,333,484 B1 | | 12/2001 | Foster et al. |
| 6,364,971 B1 | | 4/2002 | Peterson, Jr. et al. |
| 6,434,327 B1 | * | 8/2002 | Gronet et al. ............... 329/416 |
| 6,630,991 B1 | * | 10/2003 | Kitamura et al. ............. 356/43 |
| 2002/0020696 A1 | * | 2/2002 | Kitamura et al. ........... 219/390 |

OTHER PUBLICATIONS

Dictionary.com, definition of insulation, <http://dictionary.reference.com/search?q=insulation> (accessed May 6, 2006), 2 pages.*

* cited by examiner

*Primary Examiner*—Jonathan Johnson
(74) *Attorney, Agent, or Firm*—McNees Wallace & Nurick LLC

(57) ABSTRACT

A welding apparatus includes a workpiece housing having a window therethrough and having a welding access therethrough for a welder to an interior of the workpiece housing. The workpiece housing is metallic with a heat insulation on an internal surface thereof. A lamp heat source is directed through the window and at the workpiece in the interior of the workpiece housing. A gas source delivers a controllable flow of a shielding gas to the interior of the workpiece housing. A temperature sensor senses a temperature of the workpiece within the interior of the workpiece housing. A feedback controller controls the power to the lamp heat source responsive to the temperature of the workpiece. To perform welding, the workpiece is placed into the interior of the workpiece housing so as to have its temperature sensed by the temperature sensor, and the gas source is operated to envelope the workpiece in the shielding gas. The workpiece is heated by powering the lamp heat source responsive to a setpoint input and to the temperature of the workpiece. The workpiece is welded using a welder operating through the welding access.

5 Claims, 3 Drawing Sheets

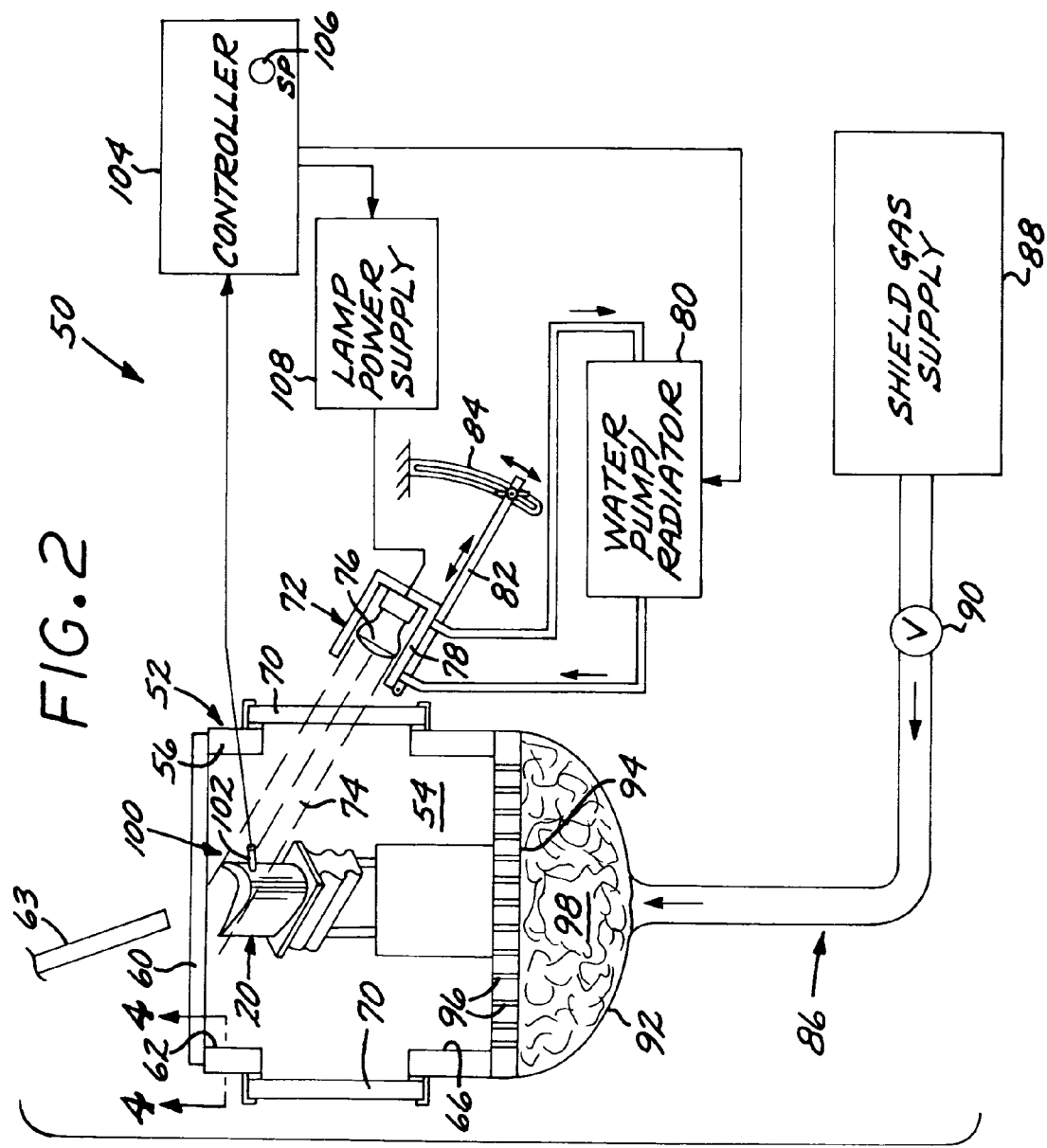
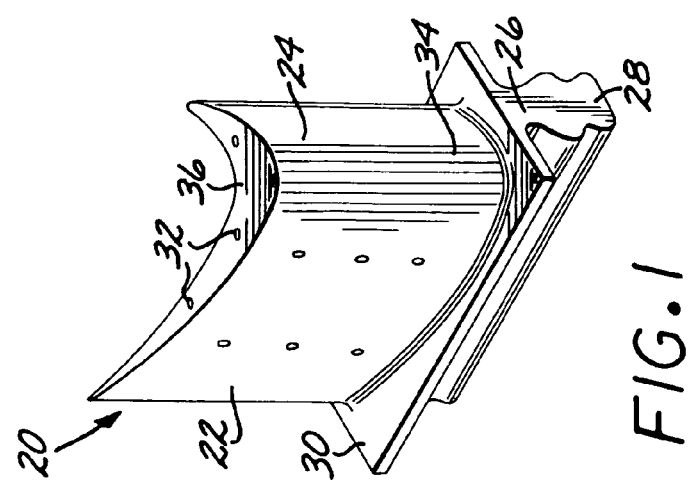

APPARATUS AND METHOD FOR PERFORMING WELDING AT ELEVATED TEMPERATURE

This invention relates to the welding of articles, wherein the articles are maintained at elevated temperature during the welding operation, and more particularly to the weld repair of superalloy components of gas turbine engines at elevated temperature.

BACKGROUND OF THE INVENTION

In an aircraft gas turbine (jet) engine, air is drawn into the front of the engine, compressed by a shaft-mounted compressor, and mixed with fuel. The mixture is burned, and the hot combustion gases are passed through a turbine mounted on the same shaft. The flow of combustion gas turns the turbine by impingement against an airfoil section of the turbine blades and vanes, which turns the shaft and provides power to the compressor. The hot exhaust gases flow from the back of the engine, driving it and the aircraft forward.

In the most common approach, the turbine blades are cast from nickel-base superalloys. In service, the turbine blades are subjected to extremely aggressive conditions of elevated temperature and harsh environment. It is not uncommon that some of the airfoil, particularly the portion near the tip, of the turbine blade is lost during service by a combination of erosion, corrosion, and oxidation damage. As the tip is removed, gas leakage around the turbine blade and thence around the turbine increases so that the efficiency of the gas turbine engine decreases.

Because gas turbine blades are expensive to produce as new-make articles, whenever possible the damaged turbine blades are repaired rather than scrapped. The repair involves adding new material to the tip or other damaged portion of the turbine blade by welding. In the welding operation, the same material of the turbine blade (or a different material in some cases) is melted onto the damaged area and then allowed to solidify to build up the damaged portion and return it to its permitted dimensional range.

Some of the nickel-base superalloys used in turbine blades are subject to embrittlement and cracking when the welding operation is conducted with the portion of the turbine blade adjacent to the welded region at a relatively low temperature. To accomplish the welding of these alloys, a process termed Superalloy Welding at Elevated Temperature (SWET) has been developed. As described in U.S. Pat. Nos. 5,897,801 and 6,124,568, whose disclosures are incorporated by reference, the SWET process involves preheating the portion of the turbine blade adjacent to the welding region to an elevated welding temperature prior to welding and maintaining the turbine blade at the welding temperature during the welding operation. The welding is performed in a controlled-atmosphere glove box or similar enclosure to avoid undue oxidation of the turbine blade. Before the welding operation, there may be a separate pre-welding heat treatment, and after the welding operation there may be a separate post-welding heat treatment.

The SWET welding process has been successfully applied to the weld repair of turbine blades and other superalloy components. However, the repair is relatively slow. It also requires that the welding operator control a number of different facets of the welding operation at once. Although the operators are highly skilled, performing the welding operation may overtax their abilities, and in some cases the welding cannot be accomplished successfully. Accordingly, there is a need for an improved approach to the welding of materials at elevated temperatures. The present invention fulfills this need, and further provides related advantages.

SUMMARY OF THE INVENTION

The present approach provides an apparatus and method for performing welding operations on a workpiece at elevated temperatures. The approach allows the workpiece to be maintained at the proper elevated welding temperature with good precision, and also allows pre-welding and post-welding heat treatments to be performed with precise temperature and time control, and in a precisely controlled inert gas environment. All of the heat treating and welding is performed in a single apparatus, without the need to move the workpiece between different facilities. The workpiece may be heated much more rapidly and evenly than with prior elevated-temperature welding apparatus. The longevity of the heat source is improved. One embodiment of the apparatus is self-contained except for the welding equipment.

An apparatus for performing welding on a workpiece at elevated temperature comprises a workpiece housing having a window therethrough and having a welding access therethrough for a welder to an interior of the workpiece housing. The interior of the workpiece housing is sized to receive the workpiece therein. The workpiece housing is metallic with a heat insulation, preferably a ceramic thermal barrier coating, on an internal surface thereof. The apparatus includes a lamp heat source directed through the window and at the workpiece in the interior of the workpiece housing, a gas source that delivers a controllable flow of a shielding gas to the interior of the workpiece housing, and a temperature sensor that senses a temperature of the workpiece within the interior of the workpiece housing. A feedback controller has a setpoint input and an input responsive to the temperature sensor, and the feedback controller controls the power to the lamp heat source responsive to the temperature of the workpiece.

The workpiece may be of any operable type that requires elevated-temperature welding. A workpiece of most interest is a gas turbine component made of a nickel-base superalloy, such as a gas turbine blade.

The workpiece housing may be made of any operable material, but a stainless steel such as a 300-series stainless steel is preferred. The workpiece housing preferably has a wall having an interior shape that is curved in its corners to avoid dead gas spaces in the corners. The workpiece housing preferably has a removable insulated top cover that provides the welding access. The window is typically made of quartz.

The lamp heat source comprises at least two quartz lamps, and preferably at least four quartz lamps. There is desirably a cooled lamp housing in which the quartz lamps are received. The lamps are preferably supported on a support that is adjustable to establish an angle of incidence of the lamp output beam upon the workpiece and a distance of the lamp from the workpiece.

The temperature sensor is desirably a non-contacting pyrometer or a contacting thermocouple.

The gas source preferably includes a gas distribution structure in a bottom of the workpiece housing, to ensure that the shield-gas flow is evenly distributed.

A method for welding a workpiece at elevated temperature comprises the steps of furnishing the workpiece and furnishing a welding apparatus of the type discussed herein, and a welder that may be positioned to weld the workpiece through the welding access. The method includes placing the workpiece into the interior of the workpiece housing so as to have its temperature sensed by the temperature sensor, operating the gas source to envelop the workpiece in the shielding gas, heating the workpiece by powering the lamp heat source responsive to the setpoint input and to the measured temperature of the workpiece, and welding the workpiece using the welder.

The step of heating may include steps of performing a pre-welding heat treatment of the workpiece prior to the step of welding, and/or performing a post-welding heat treatment of the workpiece after the step of welding, as well as maintaining the workpiece at a welding temperature during the step of welding.

The present approach provides a convenient approach for performing superalloy welding at elevated temperature (SWET) welding. The size of the workpiece housing may be scaled to accommodate one or more workpieces at a time. The number and positioning of the heating lamps may also be optimized to the nature of the workpiece(s) and the precise treatment to be performed. Heat treatments may be employed in addition to the basic temperature control at the welding temperature. The present approach reduces the ancillary duties of the welding operator, allowing the welding operator to concentrate on the welding operation.

The present approach also may be used for brazing. Thus, as used herein, the term "welding" encompasses brazing as well as repair welding of individual workpieces and multi-piece joining welding of two or more workpieces.

The present approach produces substantially better controllability and reproducibility in the welding operation than prior approaches, leading to a high-quality welded article. The present approach also significantly improves repair/manufacturing operations in regard to efficiency and workflow. In prior approaches, the workpiece was pre-welding heat treated in a separate heat-treating facility that was sometimes in another building or even at another site, moved into the SWET-welding facility, heated to the welding temperature and welded, cooled, moved to the separate heat-treating facility, and then post-welding heat treated. This process could require several days to complete, considering the need to move the workpieces to the heat treating facility, accumulate furnace loads of workpieces to be heat treated, wait for an available furnace, perform the actual heat treating, and return the workpieces to the welding facility. In the present approach, the pre-welding heat treatment, welding, and post-welding heat treatment are accomplished in a single facility in a continuous manner. The welding apparatus may be placed at a convenient location in the repair facility to allow a smooth flow of workpieces from pre-welding operations such as cleaning, to the welding facility, and then to post-welding operations such as final coating. The efficiency of the repair process is thereby improved and the costs reduced.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a perspective view of a welding workpiece in the form of a turbine blade;

FIG. 2 is a schematic view of a welding apparatus and a welder, with the workpiece housing in side sectional view;

DETAILED DESCRIPTION OF THE INVENTION

Figure 3:
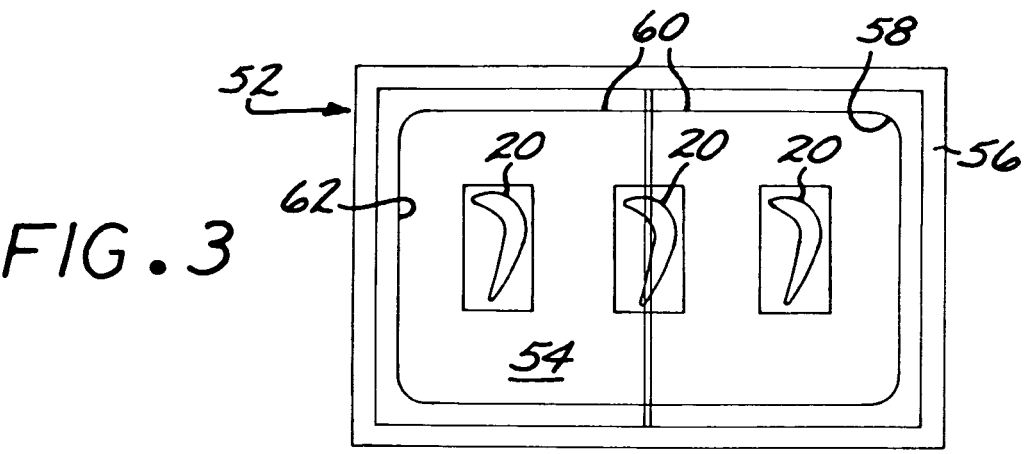
FIG. 3 is a schematic top view of the workpiece housing of FIG. 2.

FIG. 1 depicts a welding workpiece 20 in the form of a gas turbine blade 22 which has preferably previously been in service, or which may be a new-make article. The gas turbine blade 22 has an airfoil 24 against which the flow of hot combustion gas impinges during service operation, a downwardly extending shank 26, and an attachment in the form of a dovetail 28 which attaches the gas turbine blade 22 to a gas turbine disk (not shown) of the gas turbine engine. A platform 30 extends transversely outwardly at a location between the airfoil 24, on the one hand, and the shank 26 and dovetail 28, on the other. There may be one or more internal cooling passages extending through the interior of the gas turbine blade 22, ending in openings 32.

The airfoil 24 of the gas turbine blade 22 may be described as having a root 34 and a tip 36. If the length of the airfoil 24 between the root 34 and the tip 36 is shorter than the minimum acceptable dimension, either due to removal material during service or an undersize newly made article, the airfoil 24 may be lengthened by welding additional material onto the tip 36. The present approach is described in relation to such an addition of material onto the tip 36 of the airfoil 24 of the gas turbine blade 22, as that is a preferred application. Other types of workpieces 20 of particular interest are high-pressure-turbine nozzles (vanes), low-pressure-turbine nozzles (vanes), and shrouds. However, the present approach is limited to these types of workpieces, and may be applied in relation to any operable workpiece 20.

The preferred embodiment is utilized in relation to the gas turbine blade 22 which has previously been in service, and that embodiment will be described although the invention may be used as well in relation to newly made articles. The gas turbine blade 22, which has previously been in service, was manufactured as a new-make gas turbine blade, and then used in aircraft-engine service at least once. During service, the gas turbine blade 22 was subjected to conditions which degrade its structure. Specifically, a portion of the tip 36 of the gas turbine blade 22 was burned away so that its shape and dimensions change, other portions may be burned and damaged, and coatings are pitted or burned. Because the gas turbine blade 22 is an expensive article, it is preferred that relatively minor damage be repaired, rather than scrapping the gas turbine blade 22. The present approach is provided to repair, refurbish, and rejuvenate the gas turbine blade 22 so that it may be returned to service. Such repair, refurbishment, and rejuvenation is an important function which improves the economic viability of aircraft gas turbine engines by returning otherwise-unusable gas turbine blades 22 to subsequent service after appropriate processing.

The entire gas turbine blade 20 is preferably made of a nickel-base superalloy. A nickel-base alloy has more nickel by weight percent than any other element, and a nickel-base superalloy is a nickel-base alloy that is strengthened by gamma-prime phase or a related phase. The nickel-base superalloys of interest are susceptible to embrittlement and cracking when welded without heating the workpiece, as described in U.S. Pat. No. 5,897,801. Examples of nickel-base superalloys with which the present invention may be used include Rene™ 80, having a nominal composition in weight percent of about 14.0 percent chromium, about 9.5 percent cobalt, about 4.0 percent molybdenum, about 4.0 percent tungsten, about 3.0 percent aluminum, about 5.0 percent titanium, about 0.17 percent carbon, about 0.015 percent boron, about 0.03 percent zirconium, balance nickel and minor elements; Rene™ N5, having a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and minor elements; and Rene™ 142, having a nominal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, about 1.5 percent hafnium, about 0.12 percent carbon, about 0.015 percent boron, balance nickel and minor elements. The present approach is operable with other alloys as well, and the use of the invention is not limited to those listed above.

FIG. 2 schematically depicts an apparatus 50 for performing welding on the workpiece 20 at elevated temperature. The apparatus 50 includes a workpiece housing 52 that is preferably made of a metal such as a 300-series stainless steel. An interior 54 of the workpiece housing 52 is sized to receive the workpiece 20 therein and to permit the use of the proper combination of exterior heating lamps to heat the workpiece. The workpiece housing is sized to receive three workpieces 20 in the illustrated embodiment, see FIG. 3.

As seen in the top view of FIG. 3, the illustrated workpiece housing 52 is generally rectangular. The workpiece housing 52 may have any operable shape and size that is most suited to the processing of a particular workpiece. For example, the workpiece housing may be hexagonal or octagonal in top view. The workpiece housing 52 has an interior shape of its wall 56 that preferably is curved in the corners 58 to avoid dead gas spaces in the corners in relation to the flow of the shielding gas, as will be discussed subsequently. The workpiece housing 52 has a removable top cover 60, preferably made of the same material, that provides a welding access 62 through the open top of the workpiece housing 52 for a welder 63 to the interior 54 of the workpiece housing 52. The top cover 60 of the illustrated three-workpiece embodiment is preferably formed as two half-covers that each cover half of the welding access 62, so that half of the interior 54 of the welding housing 52 is accessible while the other half remains enclosed so as to retain heat in the interior 54.

Figure 4:
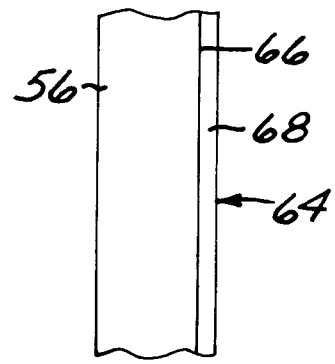
FIG. 4 is an enlarged sectional view of the wall of the workpiece housing, taken on line 4—4 of FIG. 2.

As seen in FIG. 4, the wall 56 preferably has heat insulation 64 on an internal surface 66 thereof. The heat insulation 64 aids in reducing heat loss from the workpiece 20 and more generally from the interior 54 of the workpiece housing 52. Due to the use of the heat insulation 64, the interior of the workpiece housing 52 and the workpiece 20 therein may be heated much more rapidly than possible in the absence of the heat insulation 64. The heat insulation 64 is preferably a ceramic thermal barrier coating 68 made of a material such as yttria-stabilized zirconia (YSZ), applied directly to the internal surface 66 or with a bond coat therebetween. YSZ is zirconia with typically about 2–12 weight percent, preferably about 6–8 percent, yttria added to stabilize the zirconia against phase changes. The ceramic thermal barrier coating is preferably applied by air plasma spray (APS). The preferred ceramic thermal barrier coating 68 is at least about 0.015 inch thick to provide sufficient insulation, but not more than about 0.030 inch thick so that the ceramic thermal barrier coating 68 does not flake and spall off as a result of thermal cycling the workpiece housing 52 during repeated welding operations. Optionally but preferably, a thin layer about 0.001–0.005 inch thick of a bond coat such as a NiCrAl material is applied to the interior surface 66 before the ceramic thermal barrier coating 68 is applied, to aid in its adhesion to the interior surface 66 of the wall 56. The ceramic thermal barrier coating 68 conforms to the shape of the interior surface 66, including the curved corners 58, providing excellent thermal insulation for the walls 56 of the workpiece housing 52. The top cover 60 may have the ceramic thermal barrier coating 68 applied to its interior surface. More preferably, the flat top cover 60 is insulated on its inner surface with a flat ceramic tile.

The workpiece housing 52 has a window 70 therethrough. In the preferred embodiment, there are two windows 70 on opposite sides of the workpiece housing 52, but there may be other windows as well. The window or windows 70 are preferably made of quartz so as to be transparent to light and also to resist the elevated temperatures that are experienced by the workpiece housing 52. There may be any combination of number and size of windows 70 required to provide heating access for particular-shaped workpieces 20. For example, there may be windows through all of the walls 56, to heat the workpieces on all sides if required. Additionally, the top cover 60 may have a window therein, or the top cover may have an opening therethrough (without a window) to provide access for a top lamp. A virtue of the present approach, as compared with alternative heating techniques such as resistance furnaces and induction heating, is that the heating may be made very rapid but also precisely tailored for each type, shape, configuration, and number of workpieces.

A lamp heat source 72 is located outside of the workpiece housing 52. The lamp heat source 72 has a lamp output beam 74 directed through the window 70 (or through the welding access) and at the workpiece 20 in the interior 54 of the workpiece housing 52. There is preferably a lamp heat source 72 associated with each of the windows 70, so that in the embodiment of FIG. 2 there would be two lamp heat sources 72, only shown directed through the right-hand window 70 and the other (not shown) directed through the left-hand window 70. Each lamp heat source 72 includes at least one, and preferably at least two, quartz lamps 76 (only one of which is visible in the view of FIG. 2). The quartz lamps 76 (also termed quartz halogen lamps) are available commercially in a 2000 watt size, so that in the preferred embodiment of FIG. 2 there are two quartz lamps 76 associated with each of the two lamp heat sources 72, for a total of 8000 watts of available heating power directed toward the workpiece 20 as the lamp output beams 74. This high power level allows the workpiece 20 to be heated rapidly when desired. There may be other combinations of lamp heat sources, and in an alternative design being developed for another type of workpiece, there is a further lamp heat source directed through an opening in the top cover 60. Thus, the combination of lamp heat sources may be precisely tailored to provide the optimum heating for the type of workpiece that is to be welded.

The quartz lamps 76 are preferably received in a cooled lamp housing 78. A flow of a coolant, preferably water, is controllably circulated through the lamp housing 78 by a water pump/radiator 80. The illustrated form of the water cooling structure is a closed-loop recirculating cooling system, so that external water source and drain connections are not required. However, a non-recirculating water flow system may be used as well. A flow of pressurized shop air may also be provided to cool the bulb of the lamp 76. The cooling of the lamp housing 78 cools the quartz lamp 76 and the pressurized air flow, if any, cools the lamp bulb, thereby prolonging the service life of the lamp 76. Additionally, a flow of cooling air may be provided to move heat away from the operator of the welding facility, and to blow or draw any fumes away from the operator.

The lamp housing 78 and thence the lamp(s) 76 are supported on a support 82. The support 82 is preferably adjustable to establish an angle of incidence of each of the lamp output beams 74 upon the workpiece 20, and also to establish a distance of the lamp 76 from the workpiece 20. In the embodiment of FIG. 2, the lamp housing 78 and thence the lamp(s) 76 are slidably supported on the support 82 to establish the distance of the lamp 76 from the workpiece 20, and may be fixed in place at a selected sliding location. The support 82 is pivoted at the end closest to the workpiece housing 52, and the remote end is supported on an adjustable arm 84 that may be moved to cause the support 82, and thence the lamp housing 78 and the lamp(s) 76 to be pivoted about the pivot point to adjust the angle of incidence of the lamp output beam 74 onto the workpiece 20. Adjusting the lamp(s) 76 in this manner helps to optimize the power input to, and thence the heating of, the workpiece or workpieces 20. Typically it is not necessary to uniformly heat the entire workpiece 20. Instead it is sufficient that the portion of the workpiece 20 adjacent to the region to be welded (e.g., the tip 36 in the illustrated embodiment) is controllably heated.

The welding operation is performed in an inert gas shielding atmosphere, such as an argon atmosphere, to prevent oxidation of the workpiece 20. To supply the inert shielding gas, a controllable gas source 86 delivers a controllable flow of the inert shielding gas to the interior 54 of the workpiece housing 52. The gas source 86 includes a gas supply 88 and a controllable valve 90 that meters the shielding gas from the gas supply 88 to the interior 54 of the workpiece housing 52. Experience with a prototype unit has shown that the shielding gas must be carefully introduced into the interior 54 of the workpiece housing 52 to ensure that the entire workpiece 20, or the multiple workpieces 20 where present, are fully enveloped in the shielding gas. To ensure the full envelopment, the shielding gas is introduced through a plenum 92 that delivers the shielding gas over the entire area of a gas distribution plate 94 that forms the bottom of the workpiece housing 52. The entire face of the gas distribution plate 94 has a plurality of holes 96 therethrough that spread the shielding gas over the entire bottom area of the workpiece housing 52. A mass of steel wool 98 is placed into the plenum 92 below the gas distribution plate 94 to further diffuse the flow of the shielding gas. Once the shielding gas is introduced into the interior 54 of the workpiece housing 52, the rounded corners 58 help to ensure that there are no stagnated gas volumes within the interior 54 of the workpiece housing 52. The shielding gas escapes through the welding access 62 at the top of the workpiece housing 52. The flow of the shielding gas is desirably controlled to be of high volume and low pressure. If too low a flow of shielding gas is used, air may diffuse into the interior 54 of the workpiece housing 52 and oxidize the workpiece at elevated temperature. If too high a flow of shielding gas is used, there may be turbulence that draws air into the interior 54, with the same disadvantageous results.

A temperature sensor 100 senses a temperature of the workpiece 20 within the interior 54 of the workpiece housing 52. Multiple temperature sensors 100 may be used for each workpiece 20 if desired, but typically a single temperature sensor 100 for each workpiece 20 is sufficient. The temperature sensor 100 is preferably either a noncontacting pyrometer or, as illustrated, a contacting thermocouple 102, or both may be used. The temperature sensor 100 provides a real-time measurement of the temperature of the workpiece 20 in a vicinity of the region to be welded. The lamp heat source 72 and the welder 63, when operating, provide the heat inputs to the workpiece 20. Heat is lost from the workpiece 20 through the walls 56 and top cover 60 of the workpiece housing 52 by conduction, radiation, and heating of the flow of the shielding gas, and, when the top cover 60 is removed in whole or in part, through the welding access 62. The temperature sensor 100 provides a measurement of the actual temperature of the workpiece 20.

A feedback controller 104 has a setpoint input 106 and an input responsive to the temperature sensor 100. The feedback controller 104 controls the power to the lamp heat source 72, and thence the heating power delivered to the workpiece 20 from this source, by controlling its lamp power supply 108, responsive to the temperature of the workpiece measured by the temperature sensor 100 and to the setpoint input 106. Although schematically illustrated as a manual control, the setpoint input 106 usually also includes a pre-programmed temperature profile selected to bring the workpiece 20 to a desired welding temperature (and perform pre-welding heat treatments and post-welding heat treatments as desired), and maintain it at the welding temperature so that the welding of the workpiece 20 may be accomplished. The feedback controller 104 also desirably has control outputs to the water pump/radiator 80 and to the valve 90 of the controllable gas source 86. These control outputs may be simple on/off controls to ensure that these functions are operating, or they may be selected to control the magnitude of the water flow and gas flow, respectively.

Figure 5:
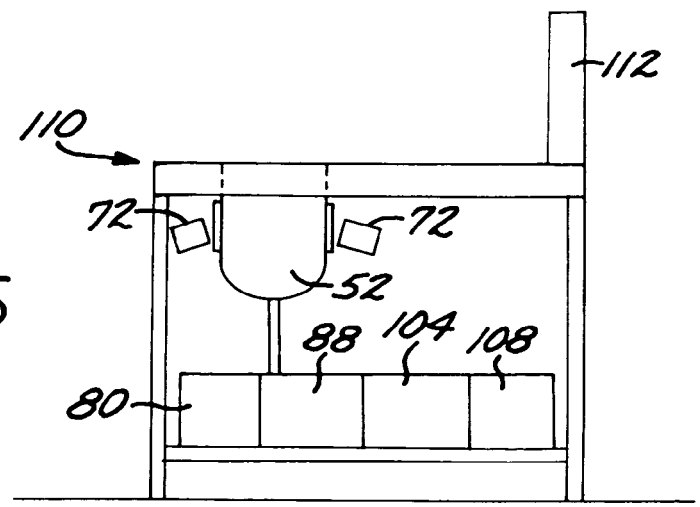
FIG. 5 is a schematic side view of an embodiment of the welding apparatus.

FIG. 5 illustrates a preferred form of the apparatus 50. The apparatus 50 as described above is built into a table 110 with a control panel 112 readily accessible to the operator. The various elements 80, 88, 104, 108, and others (and the interconnections, not shown in FIG. 5) are built into the table 110. The table 110 may be furnished with wheels so that it may be readily moved about. The apparatus 50 in this form is fully self-contained except for a power input, and sources of air and inert gas. The air and/or inert gas sources may be provided in bottled form and carried on the table 10, so that only a power input is required. This form of the apparatus 50 thus is readily moved to convenient locations in a factory setting.

Figure 6:
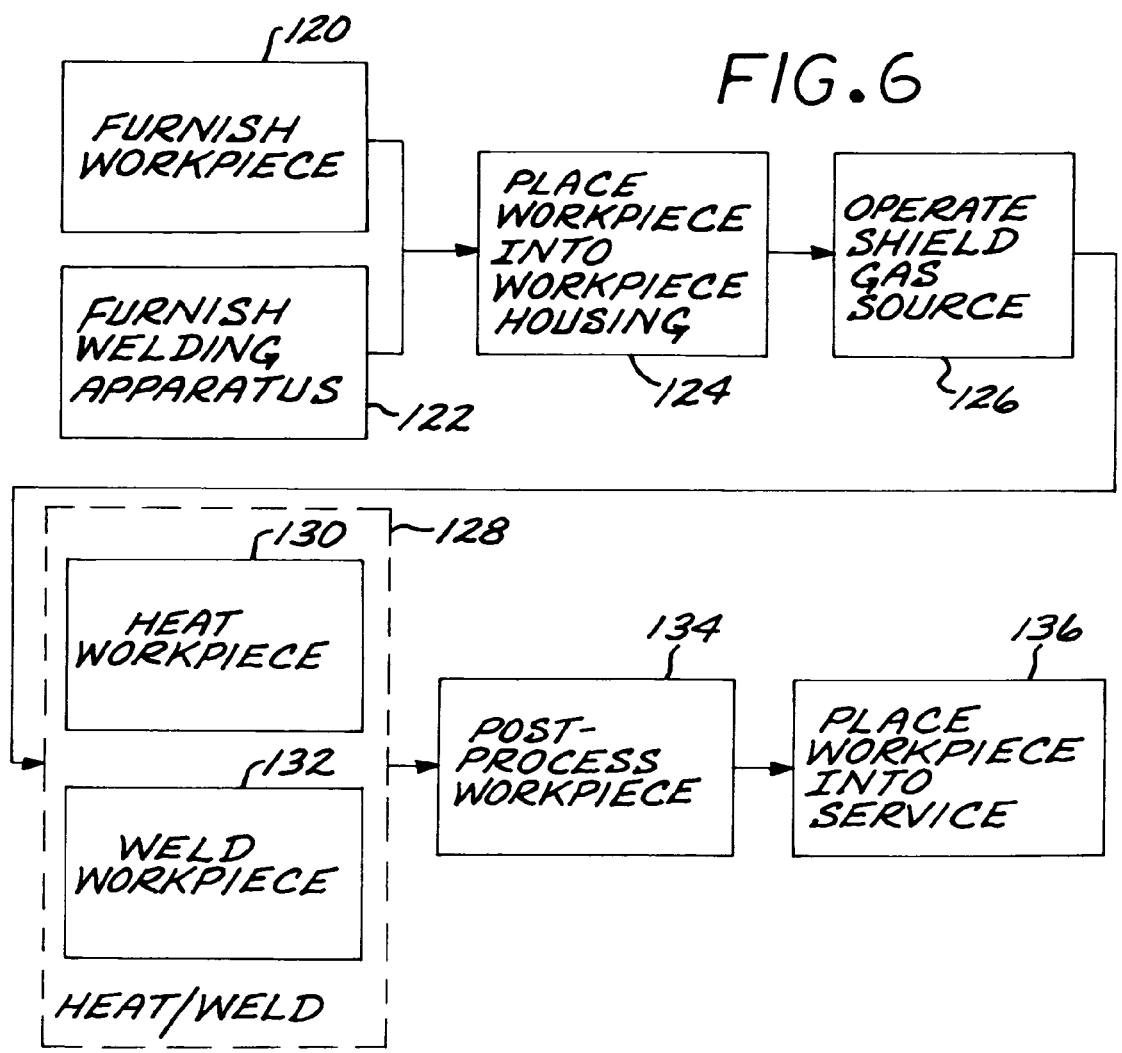
FIG. 6 is a block flow diagram of an approach for performing the welding operation.

A method for welding the workpiece 20 at elevated temperature is depicted in block diagram form in FIG. 6. The method includes furnishing the workpiece or workpieces 20, step 120, and furnishing the welding apparatus 50, such as that illustrated in FIG. 2 and/or FIG. 5, step 122. The workpiece 20 is preferably a component of a gas turbine engine, such as the gas turbine blade 22 illustrated in FIG. 1. The workpiece 20 is placed into and positioned within the interior 54 of the workpiece housing 52 so that it may be heated by the lamp output beams 74 and have its temperature sensed by the temperature sensor 100, step 124. The workpiece 20 is supported as necessary by tooling or supports.

The gas source 86 is controllably operated to envelope the workpiece in the shielding gas, step 126. Simultaneously, it is preferred that the water pump/radiator 80 be operated to cool the lamp housing 78 and the lamp 76. The operation of the controllable gas source 86 and the controllable water pump/radiator 80 (and any air cooling systems) is preferably controlled by the controller 104, to avoid the chance that an operator will forget to turn them on or have to be concerned with their proper service levels.

Figure 7:
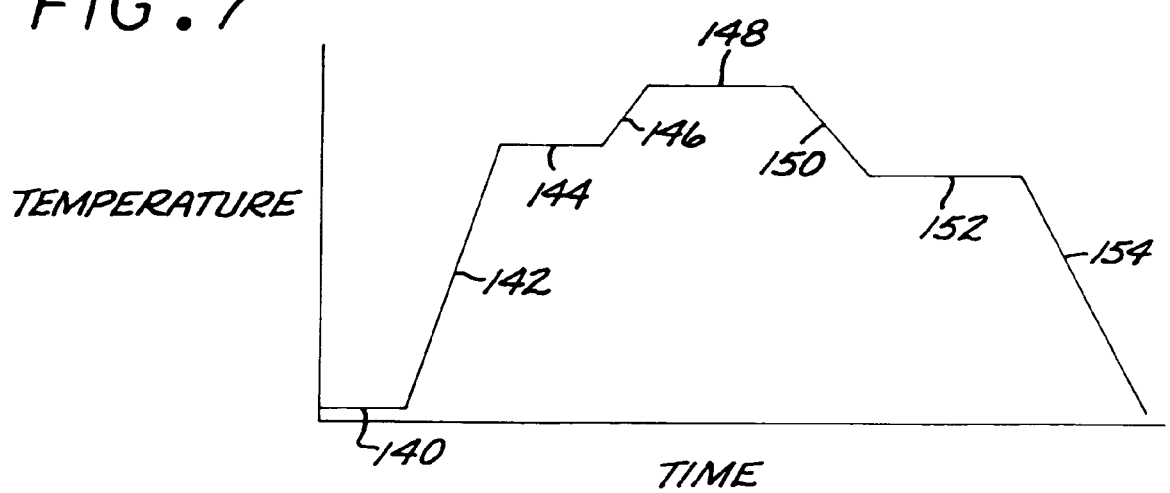
FIG. 7 is a schematic temperature-time diagram for the welding operation.

A heating/welding cycle is performed, step 128. In this cycle, the workpiece 20 is heated by powering the lamp heat source 72 responsive to the setpoint input 106 and to the temperature of the workpiece 20 as measured by the temperature sensor 100, step 130, and the workpiece 20 is welded using the welder 63, step 132. The heating step 130 and the welding step 132 are usually performed with both sequential and simultaneous substeps, and FIG. 7 illustrates a typical operating cycle. The workpiece is initially at room temperature, numeral 140, and is initially heated at a controllable heating rate, numeral 142. There may be an optional pre-welding heat treatment of the workpiece 20 prior to the step of welding, numeral 144. A typical pre-welding heat treatment requires the workpiece 20 to be maintained at a pre-welding temperature for a pre-welding time. The workpiece 20 is thereafter further heated at a controllable heating rate, numeral 146, to the welding temperature and maintained at that temperature for a period of time sufficient to perform the weld repair, numeral 148. After the welding step 132 is complete, the workpiece 20 is cooled back to room temperature at controllable rates, numerals 150 and 154. There may be an optional post-welding heat treatment, numeral 152, that is performed between the cooling segments 150 and 154, typically requiring that the workpiece 20 be held at a post-welding heat-treatment temperature for a post-welding heat-treatment period of time. The temperature profile, including the temperatures, times, heating rates, and cooling rates of steps 142–154, is readily controlled by the feedback controller 104, with a manual interrupt provided to allow step 148 to extend for as long a time as required so that the welding operation may be completed. The use of the lamp heat source 72 and the well-insulated workpiece housing 52 allow the temperature profile to be readily and precisely controlled. The specific parameters of the temperature profile of FIG. 7 are selected according to the specific type of workpiece 20 and its material of construction, and are known in the art or will be developed for various types of workpieces.

The present approach has been reduced to practice with a prototype apparatus 50 as shown in FIG. 2, and has been operated using the approach of FIG. 6 and a temperature profile such as that shown in FIG. 7.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. Apparatus for performing welding on a workpiece at elevated temperature, comprising:
    a workpiece housing having a quartz window therethrough and having a welding access therethrough for a welder to an interior of the workpiece housing, wherein the interior of the workpiece housing is sized to receive the workpiece therein, and wherein the workpiece housing is metallic with a heat-insulating thermal barrier coating on an internal surface thereof;
    a lamp heat source directed through the window and at the workpiece in the interior of the workpiece housing, wherein the lamp heat source comprises
        a quartz lamp having a lamp output beam,
        a cooled lamp housing in which the quartz lamp is received, and
        a support upon which the cooled lamp housing is supported, wherein the support is adjustable to establish an angle of incidence of the lamp output beam upon the workpiece and a distance of the lamp from the workpiece;
    a gas source that delivers a controllable flow of a shielding gas to the interior of the workpiece housing, wherein the gas source has a gas distribution structure in a bottom of the workpiece housing;
    a temperature sensor that senses a temperature of the workpiece within the interior of the workpiece housing; and
    a feedback controller having a setpoint input and an input responsive to the temperature sensor, wherein the feedback controller controls the power to the lamp heat source responsive to the temperature of the workpiece.

2. The apparatus of claim 1, wherein the sensor is selected from the group consisting of a pyrometer and a thermocouple.

3. The apparatus of claim 1, wherein the workpiece housing has a wall having an interior shape that is curved in its corners to avoid dead gas spaces in the corners.

4. The apparatus of claim 1, wherein the window is in a side of the workpiece housing and the welding access is through a top of the workpiece housing.

5. The apparatus of claim 1, further including:
    a welder having access to the interior of the workpiece housing through the welding access.

* * * * *

UNITED STATES PATENT AND TRADEMARK OFFICE
CERTIFICATE OF CORRECTION

| | |
|---|---|
| PATENT NO. | : 7,137,544 B2 |
| APPLICATION NO. | : 10/318764 |
| DATED | : November 21, 2006 |
| INVENTOR(S) | : Caddell, Jr. et al. |

It is certified that error appears in the above-identified patent and that said Letters Patent is hereby corrected as shown below:

On the Title page, Field 56, References Cited, U.S. Patent Document "5,897,801 A, 4/1999, Smashey et al." should be -- 5,897,801 A, 4/1999, Shashey et al --;

In Column 8, Line 50, "table 10" should be -- table 110 --.

Signed and Sealed this

Twentieth Day of February, 2007

JON W. DUDAS
*Director of the United States Patent and Trademark Office*